United States Patent [19]

Nelson et al.

[11] 3,806,694

[45] Apr. 23, 1974

[54] APPARATUS AND METHOD FOR WELDING JOINTS BETWEEN METAL SHAPES

[75] Inventors: Jerome W. Nelson; Robert E. Pollock; James B. Randolph, all of Houston, Tex.

[73] Assignee: CRC-Crose International, Inc.

[22] Filed: May 17, 1972

[21] Appl. No.: 254,192

[52] U.S. Cl. ............................ 219/124, 219/125 R
[51] Int. Cl. .............................................. B23k 9/12
[58] Field of Search.......... 219/60 A, 60 R, 61, 124, 219/12 JR, 125 PL, 137

[56] References Cited
UNITED STATES PATENTS

| | | | |
|---|---|---|---|
| 3,268,708 | 8/1966 | Thomas | 219/60 A |
| 3,619,552 | 11/1971 | Cape | 219/125 R |
| 3,268,707 | 8/1966 | Thomas | 219/60 A |
| 3,632,959 | 1/1972 | Nelson et al. | 219/125 R |
| 3,193,656 | 7/1965 | Bell et al. | 219/60 A |
| 3,555,239 | 1/1971 | Kerth | 219/125 R |
| 2,979,598 | 4/1961 | Laslo | 219/60 A |
| 2,894,111 | 7/1959 | McNutt | 219/60 A |

*Primary Examiner*—C. L. Albritton
*Attorney, Agent, or Firm*—Edwin M. Thomas

[57] ABSTRACT

A traveling electric arc welding apparatus using gas shielded consumable wire electrode, comprises a welding head mounted on a traveling carriage. The mounting means provide for angular shifting of the head about two different axes. Both such axes are in or near and closely parallel to the plane of the weld; e.g., in welding pipeline girth joints one axis lying as nearly as convenient in the plane of the weld is also as nearly as convenient tangential to the weld circle and thus passes near or, if desired, through the locus of the arc. The direction of feeding electrode material with respect to the weld plane is accurately set by movement about this first axis. The other axis is perpendicular to the first and lies generally in the weld plane. Means are provided for accurately aligning and setting the welding head laterally with respect to the plane of the joint; i.e., along the axis of the work in the case of a pipeline joint, by shifting the head about the second axis. Other positioning means are provided to adjust, pre-set and fix the distance or spacing of the welding nozzle from the noint. Means which can be inactivated, if desired, are included for oscillating the head back and forth across the weld path as for filling a wider gap or for capping. Quick release means permit raising the head from the work and returning it to a precisely determined working position.

29 Claims, 16 Drawing Figures

APPARATUS AND METHOD FOR WELDING JOINTS BETWEEN METAL SHAPES

BACKGROUND AND PRIOR ART

Automatic welding by traveling carriage means; e.g., in welding of pipelines in the field has often been proposed but has not been commercially successful until recently. Systems of this type encounter a number of problems, because of the high precision of arc control required for first quality welds. In order to obtain a strong, sound joint, particular and precise control must be had over position, direction and travel of the welding instrumentality with respect to the joint. High precision must be maintained also with respect to the feeding of consumable electrode material into the arc. Further precise control is desirable, and often essential with respect to control of the molten metal at the arc. In addition, particular manipulations of the welding nozzle, such as sinusoidal reciprocations, are often required to fill or cap a joint and these also must be kept under precision control. Also, the heat input into a welded joint of this kind requires careful control.

In U.S. Pat. No. 3,461,264 to Nelson and Sims, there is described a mechanical and automatic, or semi-automatic, machine for forming an inside welding pass in a large diameter pipeline. This internal pass, when completed, serves as a backing for later weldments applied from the outside. The device described in the patent clamps and holds the pipes firmly internally. By means of an internal orbiting welder device, it produces an internal "stringer bead" or first pass weld which thereafter holds the pipe sections firmly together. This bead then holds the pipe sections together and permits the clamping apparatus to be moved from the thus partially welded joint to the next joint of pipe without waiting for the remainder of the weld to be completed from the outside. It would be very desirable, obviously, to be able to perform the whole welding operation from the outside of the pipe. Under favorable conditions, this can be done with the present invention.

Except for welding in very thin-walled pipes, the initial internal bead weld described in the above-mentioned patent normally performs only part, and in thick wall pipe, only a minor part, of the full weld required. It is nearly always necessary to employ at least one and usually more external welding operations to fuse further molten metal to the pipe ends. Subsequent welds, of course, must be fused into the initial stringer bead and must be sufficient substantially to fill the gap at the joint, thereby to hold the pipe sections together adequately to meet severe specifications required for pipelining operations. For pipe having a wall thickness greater than about three-eighths inch, for example, it is usually necessary to apply at least two external welding passes after the internal bead. For pipe having a thickness of one-half inch or greater, it may be necessary to perform three, four, or even more external operations to complete the joint. Depending on the design of the joint, the width of the gap, metallurgy of the pipe, etc., it may be necessary also to reciprocate the welding head across the joint and/or to direct the welding electrode in particular directions at a slant, i.e., at angles acute to the plane of the joint in order to fill in corners, etc., on one or both sides of the gap.

While a number of devices have been suggested in the prior art for electric arc welding operations on pipe lines, as generally described above, most of them have had deficiencies and have not performed entirely satisfactorily for commercial use. A particular problem arises when the channel or kerf between the parts to be joined is quite narrow with respect to its depth. In order to minimize welding time and consumption of electrode material, to avoid excessive heat treating of the pipe metal, and to minimize the cost and complexity of the welding operation itself, it is obviously desirable to use as narrow a gap as is feasible. For thick-walled pipe, the channel or kerf between abutting pipe sections is necessarily made wider on the outside than in its deeper section. The electrode material must be directed first into the bottom of the channel without premature contacting of either side wall. Control of the metal pool at the arc is important and heat input, control of shielding gas flow, etc., tend to add further complications. One aspect of the present invention is a means for exercising control over the flow of metal in melted pool at the arc. Devices have been proposed previously for orbiting around pipe to make an external girth weld, but these have usually been massive or heavy, and have projected to a considerable height or radial distance from the pipe. In order to permit their travel around a pipeline, it has been necessary to prop the pipeline up high off the ground. This entails use of large amounts of cribbing and, of course, involves additional labor and expense. It also puts extra strain on the pipeline. It is obviously desirable to keep the profile of the orbiting instrument as close to the pipe as is consistent with good performance. One particular object of the present invention is to design an orbital welding device having a relatively low profile so as to minimize pipe lifting, propping and cribbing requirements.

The nature of the arc welding operation is such that the nozzle through which electrode material is fed often becomes clogged or contaminated. It is desirable, of course, to have ready access to this nozzle so that it can be inspected, cleaned, repaired, or replaced without major interruption of the welding operation. In order to maintain a high degree of accuracy with respect to the weld, the welding device, when moved out of adjusted position, as for cleaning or inspection, must be capable also of being returned quickly and with precision to its former and proper welding position. The present invention includes means to facilitate placement of the weld head or nozzle in exactly the same predetermined place, whenever it is moved out of position for any purpose. It also provides for convenient readjustment of the working position when required.

The welding apparatus, per se, of the present invention is designed to be attached to the side of a precisely guided orbitally traveling carrier. The latter is mounted and guided with precision to an endless track secured to the pipeline adjacent the joint to be welded. This carriage then travels around the pipe in a true plane, strictly parallel to the path and plane of the joint being welded. The welding instrumentality is secured to the carriage through a side plate which holds the instrument rigidly and with precision but which also can be adjusted with respect to the carriage and precisely maintained in the adjusted position. A carriage and track mechanism suitable for carrying the present welder apparatus, but comprising no part of the present invention, is described in detail in the U.S. Pat. to Miller and Nelson, No. 3,604,612, granted Sept. 14, 1971.

The present invention further involves some general features disclosed in, and is an improvement over that described in a copending application for U.S. Patent, Ser. No. 830,369, filed by Randolph et al., June 4, 1969.

DESCRIPTION OF PREFERRED EMBODIMENT

Figure 1:
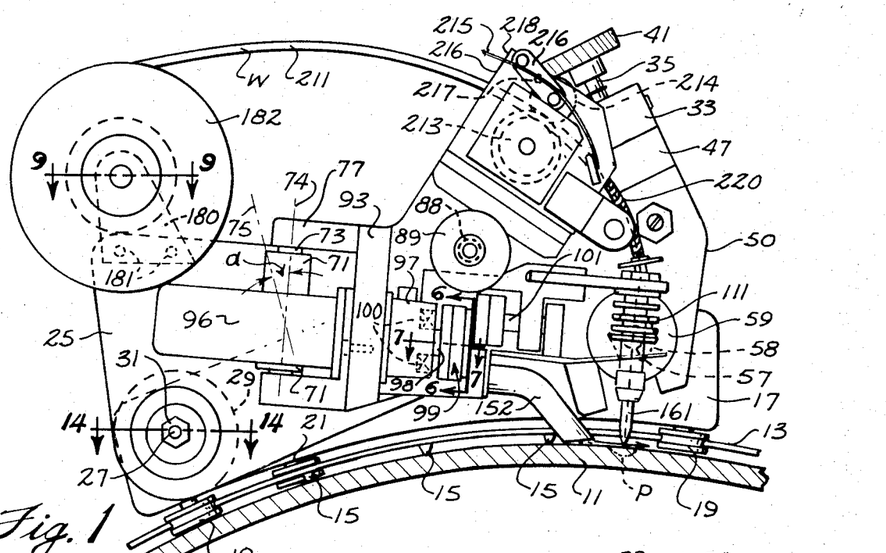
FIG. 1 is a side view of a preferred embodiment of the present invention.

Referring first to FIG. 1, the general organization of the apparatus of the present invention will be described. In order to weld a girth joint between two lengths of pipe 11 which are disposed in end-to-end relationship, only one being shown, an endless track 13 is fitted and fixed under tension around one section of the pipe near the joint and precisely parallel to the joint. Band 17 is spaced radially from but concentric with respect to the pipe by feet or stud members 15 carried by the band. A carriage member adapted to travel in orbit about the pipe consists of a base or frame 17, of solid or rigid construction, supported on the parallel edges of the track 13 by guide rollers 19. A drive roller 21 impelled by a drive motor not shown in FIG. 1 but shown at 23, FIG. 11, engages one edge of the track to propel the carriage around track. This carries the welding instrument parallel with the edge of the track and in precise alignment with the joint to be welded. The carriage and the track apparatus with its tensioning and alignment features is described and claimed in aforesaid U.S. Pat. No. 3,604,612. Additional guide rollers 19 may be included, besides those shown in FIGS. 1 and 11.

Figure 2:
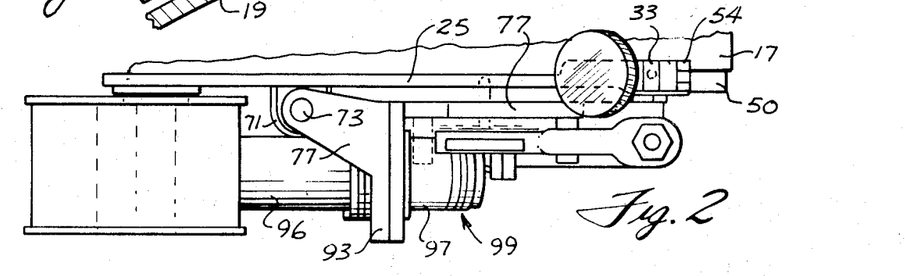
FIG. 2 is a top view of the apparatus of FIG. 1, certain parts being broken away or omitted.
Figure 4:
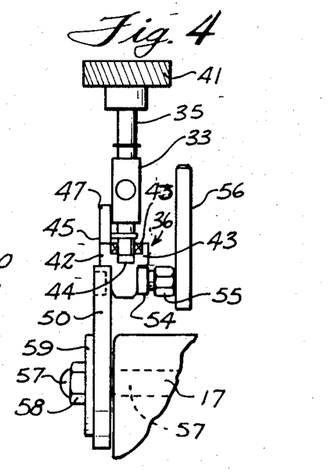
FIG. 4 is a detail view of adjustable locater means for setting the welding head in a preselected radical position with respect to the work.

A side plate or frame member 25 for supporting the welding instrument is shown best in FIGS. 1 and 2. It is also shown fragmentarily in FIGS. 4 and 5, and is pivotally secured at its rear or left end to the carriage frame 17 by a bolt 27. Through a stiff spring non-planar washer 29 and nut 31, the side plate is functionally clamped to the base 17 but can be rotated around pivot bolt 27. By releasing the right end of member 25, in a manner described below, this member and the parts supported thereby, including the welder head, gas nozzle, etc., can be lifted away from the work for inspection and/or repair. Sufficient force must be applied to overcome the frictional resistance of parts 27, 29, which preferably is sufficient to hold the weight of the frame 25, welding head, etc., against the force of gravity during head inspection, replacement, etc.

Thus, plate 25 can be shifted in its own plane about pivot bolt 27 and can be fixed in various positions as determined by screw 35 and gauge means attached thereto. The lower end of screw 35 is fixed for rotation in a gauge unit 36 and is threaded through the neck 33 Figure to be raised or lowered therein as its knurled head 41 is turned. Plastic friction elements 38 are adapted to be pressed into the threaded portion of screw 35 with sufficient force by screws 39 and 40 in member 33 to form mating threads in elements 38. This arrangement provides a dust tight seal and friction between screw 35 and parts 38 prevents inadvertent shifting of the screw.

The gauge unit 36 comprises a notched T-shaped member 42 which is recessed in its top to receive a ball bearing 43 that fits on the reduced diameter end of screw 35. The latter has a locked screw 44 on its lower end. An angle piece 45 is secured by screws 46 to the top of member 42 so as to hold the bearing 43 snugly in place. An upstanding flange or leg 47 of angle member 42 rides against a vertical face of member 33 to prevent rotation of this T-shaped member 42 which can slide up or down this face. A notch 48 in the bottom of the T-shaped member is formed to fit neatly on a stud or bolt 49 fixed with respect to the carriage frame 17, when the plate 25 is swung clockwise about its pivot 27. This stop or operating position is thus fixed with precision.

Figure 3:
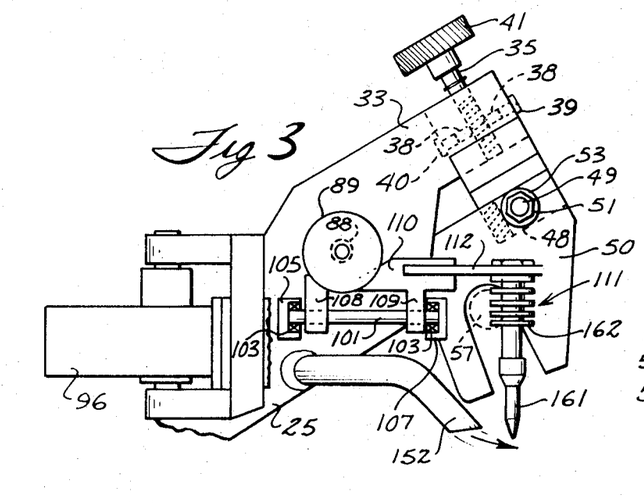
FIG. 3 is a side view of part of the apparatus of FIG. 1, certain parts being omitted.

As shown in FIG. 3, the bolt 49 is secured through a depending forked plate 50 by a nut 51 and washer 53. Plate 50 fits under one side of the Tee head member 42 and the longer leg of an angle shaped block 54 fits under the other. Bolt 49 grips these parts together. A nut 55 shown on the right side of FIG. 4 and operated by an arm 56 fixed to the nut serves to clamp parts 42, 50 and 54 together. The forked plate 50, in operating position, is clamped to a main stud 57 projecting from the orbiting carriage frame 17 by a nut 58 and a washer 59. After the screw 35 has been properly adjusted, the parts are held in operating position by tightening of nut 55 on bolt 49 by means of arm 56. When the plate 25 is to be shifted, as for inspection of the welding nozzle which it supports, the nut 55 is loosened, and the parts are swung counter-clockwise about pivot bolt 27. The parts are returned to operating position by bringing T-member 42 back to contact its side flanges against positioning stops 50 and 54, FIG. 4. Retightening of nut 55 to grip the stem of the T-member between these stop elements holds the parts precisely in their former adjusted position. As will appear more fully below, this determines precisely the distance between the welding nozzle, or the arc, and the work.

By loosening the set screws 39 and 40 if necessary, to reduce pressure on the friction elements 38 in screw 33, the latter can readily be manipulated by the operator of the welding machine as it travels around the pipe. Under some circumstances, this is highly advantageous. It permits a skilled operator to watch the progress of the weld; i.e., the deposition of metal at the arc and bring the arc closer or farther from the gap, so as to exercise a fine control over the molten metal pool at the arc.

Obviously, when the machine is first being set up, the screw 35 will be turned against the drag of friction elements 38 as needed, to adjust the front or right end as seen in FIG. 1, of plate 25 and thus shift the whole assembly of FIGS. 1 to 3 about pivot 27 to the preselected setting, as may be required. This setting determines the precise spacing of the welder nozzle 161, described below, from the joint to be welded, as will be explained hereinafter. The forked plate 50 normally remains clamped by bolt 57 to the carriage or face member 17 and is fixed there for normal operations. After adjustment, screw 35 will be held in adjusted position by the friction elements 38 unless the operator wants to control the contact tube to work distance by manipulating the screw head 41, as explained above. In the latter case, he may back off the set screws 39 and 40 and reduce the drag on screw 35.

Figures 5, 6, 7, 8, 9, 10:
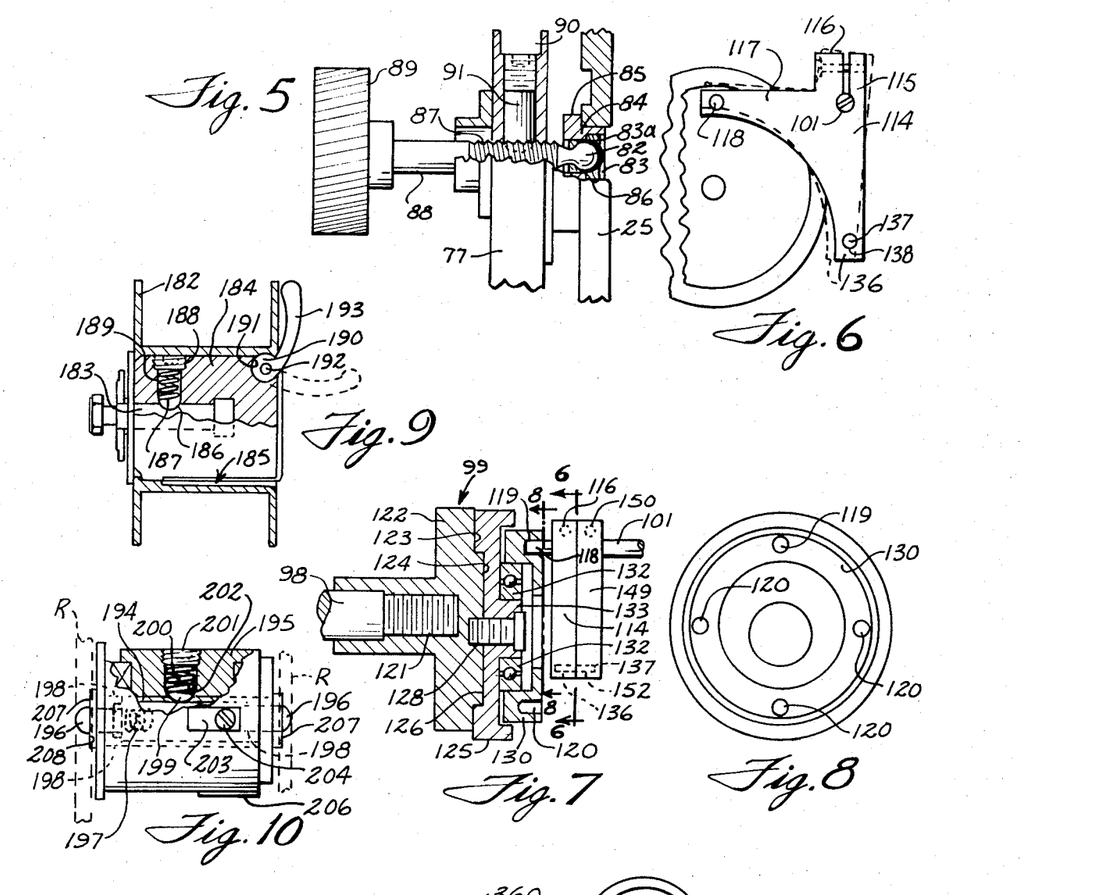
FIG. 5 is a detail view of transverse adjusting mechanism for the welding head and associated mechanism.
FIG. 6 is a cross-sectional view of oscillating mechanism, taken substantially along line 6—6 of FIG. 7.
FIG. 7 is a sectional view through a head oscillating mechanism, taken substantially along the line 7—7 of FIG. 1.
FIG. 8 is a sectional and partly diagrammatic view of the oscillating mechanism taken substantially along the line 8—8 of FIG. 7.
FIG. 9 is a sectional view, taken along line 9—9 of FIG. 1, through the wire reel holding mechanism.
FIG. 10 is a view somewhat similar to FIG. 9, through a modified wire reel mount.

The side plate 25, which supports the welder head and other parts to be described, is normally fixed firmly to the carriage base 17, except for swinging it around pivot 27 when required. It is provided with protruding bracket means 71, projecting towards the viewer, as seen in FIG. 1. Bracket 71 may be a single element or a pair of spaced ear members. As shown in FIG. 2, ears 71 which project from the face of plate 25 and are bored more or less vertically as shown in FIGS. 1 and 2 for mounting bearings for a shaft 73 which defines an axis 74 in what may be called for convenience a "vertical" plane (or more or less radial plane with respect to the pipeline). Obviously, the position of the carriage 17 with respect to the pipe will only be truly vertical at certain times as the carriage moves around the pipe and the axis 74 may not be truly radial to the pipe. For usual operation, axis 74 is normally disposed at a small acute angle ahead of a radius of the pipe. This angle is indicated at $a$ between lines 74 and 75 of FIG. 1, and obviously line 75 may extend in any direction, in or parallel to the plane of the joint to be welded, depending on the instant position of the carriage around the pipe circumference. Referring to the axis of shaft 73, however, as a "vertical" or radial position for convenience only, a sub-plate 77 or sub-frame for carrying the welder, is pivoted on shaft 73 so that it can be swung towards or away from the side plate 25 about this so-called vertical or radial axis of shaft 73, as best seen in FIG. 2. A micro adjustment, shown best in FIG. 5, is provided for shifting the sub-frame member 77 around axis 74. This will next be described.

A threaded screw 88 is mounted for rotation but with its inner end 82 secured in the frame 25. The ball-shaped end 82 of screw 88 fits between a head plate 83 with associated friction elements 83a and a pair of friction blocks 84.

Blocks 84 are held snugly against the forward (or leftward, FIG. 5) part of ball 82 by a collar 85 threaded into an opening 86 in plate 25. The sub-frame 77 is bored and threaded to receive the larger diameter threaded portion 87 of the adjusting screw 81 which is operated by a knurled knob 89 secured to its forward or left end as seen in FIG. 5. In order to lock the screw 81 in adjusted position, a set screw 90 is threaded into sub-frame 77 to bear on a plastic friction element 91 made of nylon, for example, to exert a drag on the threaded portion of bolt 88 in the same general manner as elements 38, described above. This set screw 90 may be loosened for adjustment of screw 88 and retightened after screw 88 is in desired adjusted position. That is, sub-frame 77, which carries the welding head through mechanism to be described below, is adjusted to bring this welding head into proper alignment with the plane of the joint to be welded. This is entirely independent of the CTWD (contact tube to work distance) which is determined by adjustment of screw 35, as already described.

A thick flange or base member 93, projecting towards the viewer in FIG. 1, is secured to or integral with sub-frame member 77, which is pivoted in bracket means 71, and serves as a base plate for mounting a drive motor 96, a gear reducing box 97, and an output shaft 98 from box 97 which drives an oscillating mechanism 99. Shaft 98 is mounted in precision dust-tight bearings 100 to avoid play. The axis of shaft 98 is arranged approximately parallel to the plane of the weld, which plane normally contains the axis of the welding nozzle through which a wire electrode is advanced to the welding arc, as will be described below. The oscillating mechanism operated by this shaft 98 and drive motor 96 serves, when desired, to move the welding head cyclically from side to side of the gap between pipe ends as the welding mechanism travels in orbit around the pipe joint.

Another shaft 101 arranged more or less parallel with shaft 98 is journaled in precision bearings 103 fitted in brackets or arms 105 and 107 which also are fixed to or integral with the sub-frame 77. This shaft 101 is fixed through arms 108 and 109 to and supports a bar or bracket 110, to which a welding head or nozzle indicated generally at 111 is secured through an electrically nonconductive extension plate 112, the latter being firmly secured to or forming an integral part of bar 110. See especially FIG. 3. Member 110 is mounted for pivotal or rocking movement on the shaft 101. The shaft 101 is parallel to shaft 98 and the axis of shaft 101 passes through or approximately through the vertical welding plane, which is the general locus of the nozzle 111; i.e., the welding head, except for its oscillatory movement is in or essentially in the vertical plane of the welding arc and of the joint to be welded. In the embodiment of FIG. 1, the arrangement is such that the welding head 111 can be oscillated through various angles of rotation about the axis of shaft 101. Variable throw means for such variable oscillation will next be described, by reference to FIGS. 6, 7 and 8.

An arm or bell crank 114, in the shape roughly of an inverted L, is located on shaft 101 by a split arm 115. The latter is held adjustably in clamping position on said shaft 101 by a screw 116, FIG. 6. A leftward projecting arm 117 of member 114, as seen in FIG. 6, carries a pin 118 which neatly engages a selected opening 119 in a ring member 130 of an oscillating eccentric mechanism described further below. The member 130 may be provided with additional openings 120 so that if and when wear occurs in one of the openings, such as opening 119, the pin 118 is simply shifted to another opening. Such a shift can be made by disengaging the pin 118, rotating ring 130 about its bearing 132, and reengaging the pin in another hole.

The forward end of shaft 98 is threaded at 121 to fit into and drive in rotation an eccentrically mounted disc 122. The forward face of disc 122 is milled away at 123 to provide a circular projection or boss member 124 which extends forward from and is eccentric to shaft 98. A complementary disc member 125 is cut away at 126 to fit snugly around boss member 124 with a smooth journal bearing relationship, but these parts normally are tightened together to operate as a unit. A headed and threaded stud 128 secures member 125 to member 122, passing through the center of member 125 but eccentric to shaft 98 in disc 122. By loosening the stud 128 and relatively rotating the member 125 with respect to member 122, the active opening 119 may be shifted to vary the eccentricity or "throw" of the eccentric assembly, which thus operates to produce an oscillating motion on pin 118. In one extreme of adjustment, the parts can be made to operate as if actually concentric so there is no throw or reciprocation movement, whereas at the other extreme, maximum throw is achieved.

The floating ring member 130 is mounted on a projecting central boss 133 of member 125 through ball or equivalent anti-friction and play-free bearings 132. The ring member 130 normally does not rotate. It remains quite still if the head is not being oscillated; i.e., if member 125 is in concentric adjustment, or it wobbles or gyrates with a circular eccentric motion, the amplitude of which depends on the angular setting or member 125 with respect to member 122.

Obviously, the rotation of shaft 98 and of the eccentric mechanism just described, will rock the arm 117 around the axis of shaft 101, whenever there is an eccentric motion of stud 118. The latter either remains in fixed position or rocks through an angle, as indicated by dotted lines in FIG. 6, which depends on the setting of the eccentric drive mechanism. Obviously, the amplitude of lateral movement of the welding head can be adjusted to any desired value between maximum and no amplitude. Bell crank 114 has a depending arm 136 which bears a drive pin 137 in an opening 138.

A second arm 149 is separately secured to shaft 101 adjacent arm 114 through a split-arm and screw unit 150 (see FIG. 7) like that for member 135. Arm 149 has an opening 152 in its lower end in which pin 137 can be inserted to assure that arm 149 is properly aligned with arm 114. This arrangement provides a fixed setting for member 135 with respect to shaft 101 and facilitates disassembly of arm 114 and related parts without losing alignment with respect to the eccentric drive. When the part 114 is loosened at 116 from shaft 101 the previous and predetermined setting of the welding head mounted on plate 112, which is rocked by shaft 101, will not be disturbed, being maintained by arm 149. When the eccentric drive mechanism is in zero throw adjustment; i.e., for non-oscillation, the welding head 111 carried by member 112 of course does not oscillate but runs true along the weld line, under guidance of carriage 17.

As shown in FIGS. 1 and 3, a tube or nozzle 152 is arranged to deliver a weld shielding inert gas, such as carbon dioxide, argon, or helium, or suitable mixtures around the arc to prevent oxidation. With this arrangement, the gas can be fed from a suitable supply, not shown, in a direction approximately tangential to the work. This arrangement helps to confine, control and cool the molten metal pool at the arc R. See the arrow on pool P. FIG. 1.

This use of gas is a method aspect of the invention. By using a fairly high gas velocity, the molten metal in the small pool, which forms at the arc and tends to flow by gravity, is kept under better control. A A stream of gas, flowing at the rate of about 100 to 200 cubic feet per hour through a nozzle 152 approximately one-half inch in diameter restrains the pool P, FIG. 1 against a tendency to flow to the left. Assuming that the apparatus is traveling to the left and going down hill around the pipe, as it approaches the "vertical" position (at the side of the pipeline, for example) the metal would normally flow down hill ahead of the arc. The gas stream emerging at high velocity from nozzle 152 counterbalances the force of gravity. Not only is it effective in the "vertical" position; it is helpful all around the pipe weld and is useful when running horizontal welds, for example, between adjacent edges of flat plates. The preferred gas velocity is that obtained by flowing 125 to 175 cubic feet per hour, of any of the gases mentioned above, through a one-half inch diameter nozzle. However, the wide range of 100 to 200 feet per hour is useful. At velocities lower than 100 feet (volume) and through a one-half inch nozzle, the gas has little or no effect. Velocities higher than 200 are excessive and troublesome. Within the ranges mentioned above, the flowing gas also has a beneficial cooling effect on the metal pool.

The welding head 111 per se comprises a conventional conductive welding electrode guide 161 or nozzle tip plus conventional copper or brass base 162 and connections not shown for electric current, shielding gas, etc. The conventional outer shield of ceramic material surrounds nozzle 161, but is omitted in FIGS. 1 and 3 to show the action of the gas from tube 152 on the metal pool P. With or without cyclical oscillation or reciprocation, the head is aligned by adjustment around axis 74 to travel properly in the plane of the weld and along the weld line, as determined by adjustment of the screw 89, described above. When set for oscillation, however, the eccentric mechanism 125, 130, etc., rocks the head through the desired and predetermined angle for which the eccentric is set. The head is aligned to oscillate with the weld plane at the center of its oscillations.

For adjustment with respect to the plane of the weld; i.e., adjustment of the nozzle along the axis of the pipes being welded, the welding head and the parts supporting it can be pivoted around the so-called "vertical" or radial axis 73, FIG. 1. For sinusoidal travel of the desired amplitude, as for filling a wider gap or for a capping pass, the oscillating mechanism is adjusted so that the member 110 and the welding head will be rocked about the axis of shaft 101. Shaft 101 preferably lies in or close to the plane of the weld and is more or less in line with and nearly tangential to the path of movement of the welding head around the work. The two axes of head adjustment or movement, controlled respectively by screws 35 and 81, are referred to respectively as a "vertical" axis and a "tangential" axis, although neither term is strictly accurate.

The main side plate or frame member 25 is provided at its rear or left end, as seen in FIG. 1, with a rearwardly extending bracket 180 secured thereto by appropriate fastenings 181. This bracket 180 supports a reel 182 of expendable electrode wire which is to be supplied to the welding nozzle.

In order to control the unreeling of electrode wire from reel 182 a hub structure includes a frictional retarding or braking mechanism. This comprises a shaft 183 projecting through and secured to the bracket 180 so that it cannot rotate. A hub body 184 fits the central opening in reel or spool 182 to which it is locked against relative rotation by a cam shaped member 190 described below. The hub is mounted on dust tight, sealed ball bearings for free rotation on shaft 183 and bears an aligning spline 185 for wire reel 182. A friction element or brake shoe 186 of plastic frictional material is pressed against shaft 183 by a coiled compression spring 187 seated between shoe 186 and an adjustable screw plug 188 threaded into a radial bore 189 which extends from the cylindrical outer surface of hub body 184 to the shaft. By adjusting the screw plug 188, the tension applied to the brake element 186 can be set as desired. This keeps the wire feed under control and prevents uncoiling and tangling which can occur if the wire reel runs too freely.

The hub assembly also includes a lever operated cam 190, mounted in a slot 191 in the hub body, where it is held for pivotal movement by a pin 192 extending across the slot. The lever 193, which is integral with cam element 190, is moved down to the dotted line position, FIG. 9, and a plastic spool 182 wound with wire W is slipped onto the hub. Then the lever is turned to the upright position against the end of the spool, as shown in full lines in FIG. 9. The eccentric cam element bites into the inside of the spool, which is slightly compressible, passing over center to firmly lock the spool to the hub. A spline 185, and a corresponding groove in the spool, are formed so that the spool cannot be put on the hub wrong end first. This assures that the spool must turn with the hub and that the wire will be led off the spool in the right direction.

The hub arrangement just described is highly satisfactory for the welding apparatus of FIGS. 1 to 9. An alternative construction and arrangement is shown in FIG. 10 which is preferred where space available is limited, e.g., in welder units employed inside a pipeline.

In FIG. 10, a somewhat more compact hub is shown which is adapted to be snapped into a receiver R having walls on both ends of the spool. This device includes a central hollow shaft 194 mounted in sealed anti-friction bearings in the outer hub body 195. Slidable pintle elements 196 are mounted inside the hollow shaft and urged outwardly by a coiled compression spring 197 placed between them. Limit stop elements in the form of externally threaded sleeves 198 surround the pintles 196 and flanges on the latter prevent their ejection by the spring 197. Friction brake elements 199 are held against the outer surface of shaft 194 by coil springs 200 under adjustable compression by screw plugs 201. The brake elements, springs, 200 and plugs 201 are seated in radial bores 202 in the hub body 195. A depressible spring catch 203 mounted by a screw 204 in a notch 205 holds a wire spool in place. The latter is grooved to fit over a spline 206 on hub body 195 so that the spool cannot be put on the hub wrong end first. A rib 207 across an outer end of one of the sleeves 198 fits into a corresponding groove 208 inside the end wall 209 of the receiver R. These hold shaft 194 against free rotation. The hub and brake device of FIG. 10 may be interchangeable with that of FIG. 9. Both can be made to fit the same spool of wire, such as spool 182 of FIG. 1. However, the space requirements for the device of FIG. 9 are somewhat greater; also, a larger spool of wire may be used where operating space is not limited. For this reason, the hub and brake unit of FIG. 10 will be preferred where space is limited whereas the simpler hub of FIG. 9 is advantageous where operating space permits and where the reel is supported at one end only. The lever 193 and its associated cam firmly lock the spool on the hub against axial misplacement; the spline 185 not only prevents putting the spool on backwards but also gives further assurance that the hub will not turn without the spool and vice versa.

The hub of FIG. 10 is normally used where the mount is a receiver R having opposed side walls into which the pintles 196 can be snapped. Ribs 207, which may be on one end or on both ends and fixed to the hollow shaft or axle 194, are held in grooves in the end wall elements R to prevent rotation of this shaft. The main hub body 195 rotates around shaft 194 as the reel of wire is unwound; the brake or friction device 199, 200, 201 provides a drag which maintains enough tension on the wire to prevent it from springing out or partially uncoiling of the spool. Friction elements 185, 187, etc., perform the same function for the hub of FIG. 9. In either case, premature uncoiling or tangling of the wire is prevented.

A flexible insulated guide tube 211 of suitable non-conductive plastic material guides the electrode wire as it comes off the reel or spool 182 to a feeding or wire drive mechanism which also is supported on the sub-frame member 77. The latter also carries the welding head 111 and its oscillating mechanism. The wire drive thus floats with the welding head support and is always more or less aligned with it, regardless of the adjustment of horizontal control screw 89. Thus, the flexible guide tube 211 permits relative adjustment between the rigid side plate or main frame 25 which carries the wire reel, and the secondary frame 77 which directly supports the wire feed mechanism and the welding head. The wire drive comprises a driven feed roller 213, a pivotally mounted pressure roller 214 adapted to hold the wire against roller 213, and spring tension means 215 for applying the force to keep these rollers in firm wire feeding engagement. A suitable electric motor, not shown, drives roller 213 through appropriate gearing, not shown. The pressure roller 214 is supported by an axle fixed on a pivoted arm 216, the latter being mounted at a point intermediate of its length on a pivot pin 217 secured to a block 218 which is part of the frame for the wire feed means. The latter frame is rigidly secured to sub-frame member 77. The in-guiding plastic tube 211 directs the wire W directly toward the bite of the rollers, regardless of the adjustment of lateral or horizontal alignment screw 89; a main purpose of this is to prevent any significant crimping or imparting of abnormal curvature to the wire as it is advanced to the welding arc. As the wire leaves the feed rollers, it continues to be carefully guided, passing through a conductive metal wire guide tube in the form of a stiffly flexible helically wound steel wire conduit 220. From the feed rollers on to the welding nozzle, the wire is at the electric voltage potential of the arc, whereas spool 182 and tube 211 are insulated completely from the metal parts of the apparatus. Tube 220, of course, is flexible enough to permit rocking of the welding head about axis 101, this motion being relatively small, so good directional control is maintained over the electrode wire and its inherent curvature or cast is not altered. This is very important; if the wire should twist or turn on its approach to the arc, it could contact one side or the other of the narrow welding gap prematurely, upsetting the arc and causing serious flaws in the weld.

The guide 220 is sufficiently stiff as to apply a restoring and stabilizing force to the welding head whenever it departs from a normal or central position, e.g., if and as it oscillates. Thus, the electrode wire W from supply pool or reel 182 travels through the insulated plastic guide tube 211, into the feed mechanism, and then out through the electrically conductive resilient guide 220 and through the welding nozzle to the arc without significant flexing or twisting.

By mounting the wire feed mechanism on the shiftable sub-frame 77, taking care in its design to eliminate or at least to minimize distortion of the electrode wire, superior control over the arc can be maintained. This control is helped by further controlling the direction and velocity of the inert gas which flows over and around the arc. The metal in the molten pool is restrained from running downhill ahead of the arc as the arc swings from horizontal position, at the top of a pipe, for example, to the vertical at the side of the pipe. This effect appears to be due in part to the tangential direction of the gas stream as it emerges from the nozzle 152 across the pool and partly due to its cooling effect on the pool. A fairly high gas velocity is preferred and the nozzle is designated to produce such velocity without excessive gas consumption.

By contrast, the more conventional method of supplying gas through a concentric outlet around the contact tube tends to push the metal out of the pool and cause it to run ahead, particularly on the vertical run at the sides of the pipe. The system described above gives much better control. The nozzle applies a drag force over the pool which opposes its tendency to flow by gravity.

The means for feeding and directionally controlling the electrode wire, together with means for maintaining tension at the reel or spool, contribute substantially to successful operation of the welding process. However, the specific wire advancing means are essentially those described in U.S. Pat. No. 3,632,959, issued Jan. 4, 1972 to Nelson and Randolph, two of the present inventors.

The apparatus so far described is capable of a number of other variations and modifications without departing from the spirit of the invention. Important features include the combination of a carriage-mounted primary side plate with a subordinate frame member secured to it, the first being adapted for angular adjustment in its own plane. As explained above, this primary side plate 25 can be swung up out of position at its front without losing the fine preadjustment by releasing the lock 56 which normally holds the head in down position against the stop bolt 57, FIG. 4. On replacement, the head returns to its precisely fixed adjusted position, without upsetting the former careful adjustment. Likewise, the subframe 77 is retained in its adjustment by screw 81, when the head is lifted out of or returned to welding position. Obviously, the latter mechanism, which supports and allows adjustment of sub-frame 77 with respect to the side plate 25 and about the so-called vertical axis 73 can be modified without departing from the spirit and purpose of the present invention. The adjusting screw 88 can be located at some other point than that shown, so long as it is suitable for precision control of the lateral or transverse position of the welding head, i.e., axially along the pipe. Likewise, the particular means 35 and associated parts for so-called "vertical" adjustment may be modified in various ways. The particular means 122, 118, 114, etc., by which oscillation is imparted to the shaft 101 also may be varied as will be obvious to those skilled in the art, as long as precision control over the various functions and operations is not sacrificed.

Figure 11:
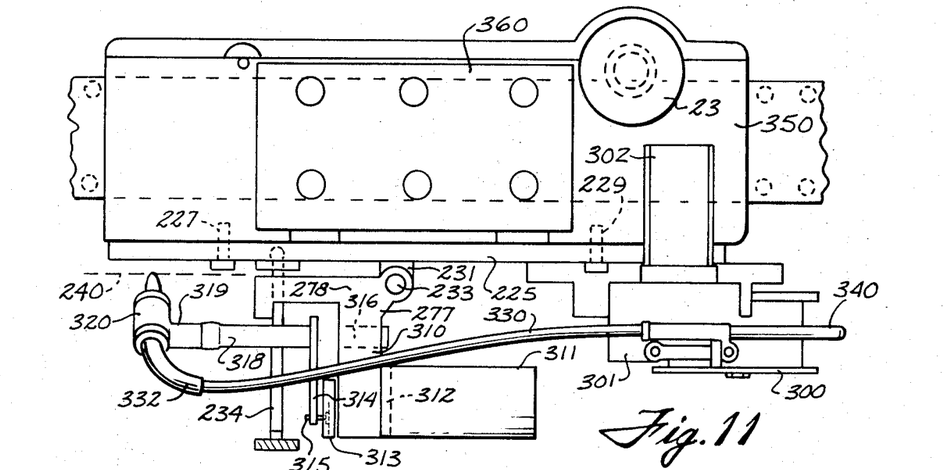
FIG. 11 is a top view of another modification of the invention and includes additional showing of the orbital carriage mechanism which transports it.

FIG. 11 shows in plan view an alternative modification which can be used in some cases and may even be preferred in certain situations. The apparatus here shown comprises a main side plate or frame 225 which is generally equivalent in function to plate 25 of FIGS. 1 to 3. It is fixed by bolts 227 and 229 to the traveling carriage 350 which may be considered to be the same as part 17. One of these bolts may be provided with supplemental means, if desired, to provide for adjustment as in the case of the apparatus of FIGS. 1, 3 and 4 described above. The plate 225 has a forwardly projecting lug or support 231 in which a "vertical" axle or pivot shaft 233 may be fitted. The latter supports a sub-frame assembly 277, which can be swung away from plate 225, about pivot 233 analogous to member 77 described above. The apparatus of FIG. 11 is shown as feeding the wire from right to left. In fact, it will often be desirable to have both righthand and lefthand versions of the welder, whether of the type of FIG. 1 or FIG. 11, so that welding can be accomplished by travel in either direction around a pipeline. That is, a pair of machines of mirror image with respect to each other may be used to weld simultaneously in opposite directions around a single joint, starting from the top, for example. The sub-frame 277, pivotally mounted on "vertical" or radial shaft 233, can be shifted in its relation to plate 225 by means of adjustment screw 234. The latter is threaded through an arm 278 of member 277 and engaged against lost motion but free to turn in plate 225. As with screw 81, described above, this is used to adjust the lateral position, i.e., the position along the pipeline axis, of the weld nozzle with respect to the welding line or plane. This welding line is indicated diagrammatically at 240 in FIG. 11.

In FIG. 11, a reel or supply of electrode wire is shown at 300 and wire feeding mechanism of the same general type as described above is shown at 301. However, the latter is not mounted on sub-frame 277 but on the rigid main frame 225. This wire feed mechanism has its own drive motor 302, as does that of FIG. 1.

An arm or bracket 310 secured to the sub-frame 277 supports a drive motor 311 for oscillating mechanism. Gear reduction means 312 of conventional type are arranged to drive a crank or eccentric member 313. The latter is connected by a link 314 to a rocker arm secured to a rockable shaft 316. The latter is mounted in sub-frame 277 and has its axis more or less parallel to the axis of the pipe being welded, i.e., transverse to the axis of the "vertical" axis of shaft 233. An adjustable pivoted arm connection 318 secures welding head support 319 so that it rocks as crank 313 rotates. Welding head 320 is secured to member 319. A flexible helical wire guide 330 of construction similar to guide 198 of FIG. 1, but much longer, extends all the way from the wire feeding mechanism 301 to the welding head. The terminal part of this guide 330 is protected by an insulated plastic or rubber cover member 332. The electrode wire is guided from its supply reel 300 which is mounted in the same way as reel 182, into the feed mechanism 301, through a plastic or rubber guide tube 340 analogous to but shorter than guide member 211 of FIG. 1.

This apparatus can be adjusted from no oscillation to maximum oscillation.

For this adjustment, the throw of the crank member 314 is changed through a T-slot in member 313, in which the head of a connecting pin 315 is held by suitable tightening means. This pin head 315 can be loosened in the T-slots and adjusted to any other desired position therein. This permits a setting for no oscillation or an adjustment of the amplitude of oscillation of the welding head about the axis of shaft 316 in the same manner that the adjustment of the eccentric assembly 122, 126, etc., of the first modification does.

One advantage of the system of FIG. 11 is that when desired, by appropriate location and directional setting of the axis of shaft 316, the welding head may be oscillated about the arc itself as the precise center of rotation. This may be desirable in certain cases, as where it is necessary, for example, to deposite molten electrode material in a gap at a substantial angle to the plane of the joint, in order to fill a corner or recess. Means for adjusting the head to or from the work are not shown in FIG. 11, but will be obvious in view of the description of FIGS. 1 to 4 above.

Figure 12:
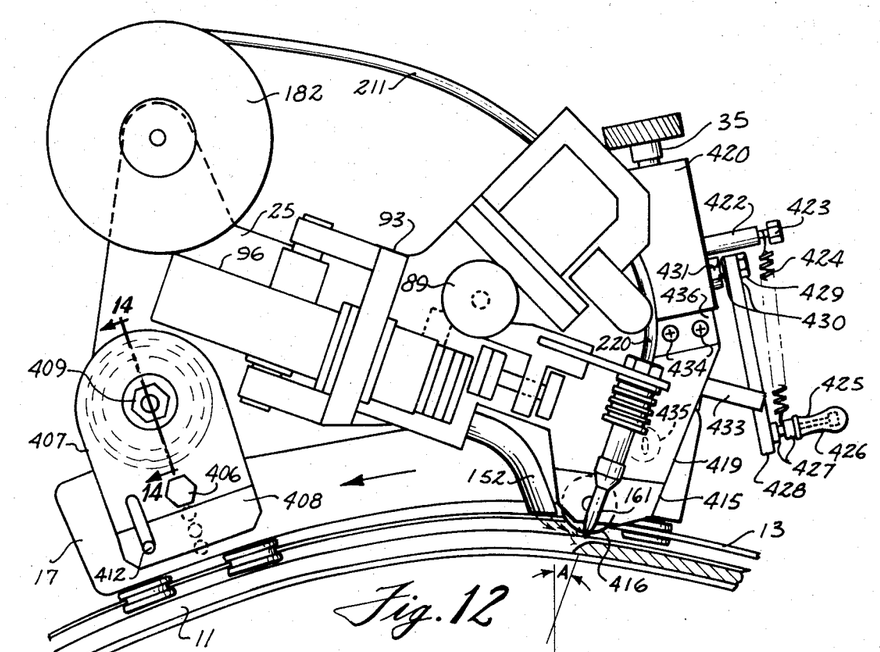
FIG. 12 is a side view of a modified apparatus having a floating side plate combined with precision prelocation mechanism for fine control of the welder head.
Figures 13, 15, 16:
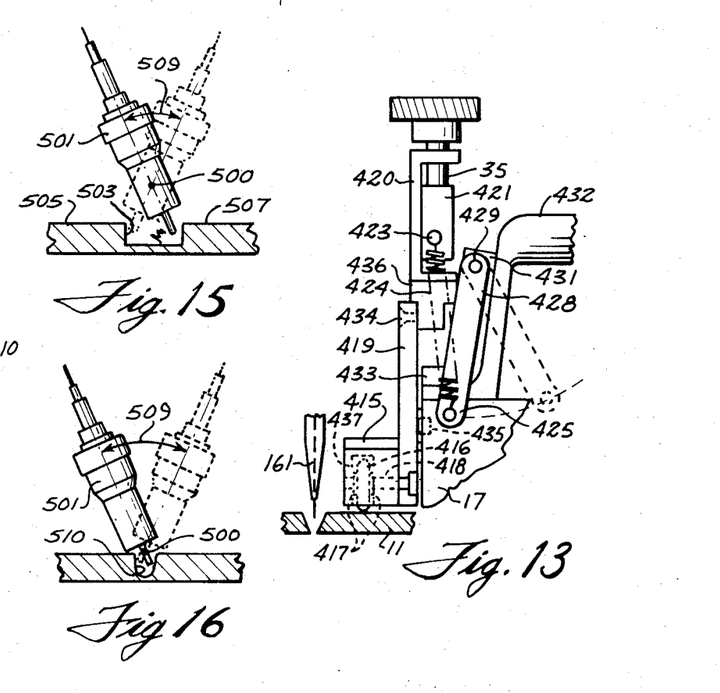
FIG. 13 is a fragmentary end view, with parts omitted taken from the right of FIG. 12.
FIG. 15 is a diagrammatic view showing shifting of a welding head about a pivot axis, according to an aspect of the present invention.
FIG. 16 is a similar view wherein the pivot axis is located nearer the welding arc.
Figure 14:
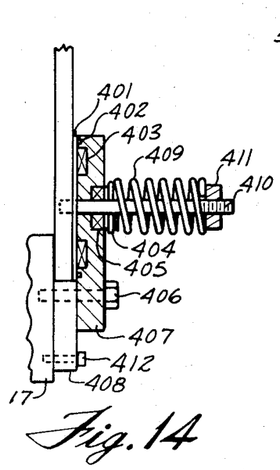
FIG. 14 is a sectional view taken substantially along line 14—14 of FIG. 12.

FIGS. 12, 13 and 14 show a modification having a floating side plate, which is particularly desirable for pipeline welding. One end of this plate or frame member is pivoted to the side of the carriage by a broadly based pivot means which constrains the plate to movement in a plane parallel to the side of the carriage and parallel to the plane of the weld. The other end of the plate rides on a contractor means which follows the surface of the work being welded. In case of a pipeline welding operation, this insures that the spacing of the welding head from the work will remain constant, even though the pipe is out of round or otherwise irregular. This modification will be described next. In a sense, this spacing unit may be considered a welding head guide unit equivalent to the carriage, at least broadly.

Assuming that a girth weld is to be formed in pipeline 11, a carriage 17 is mounted to travel on a precision guide truck 13, essentially as described above in connection with FIG. 1. Plate or frame member 25 is essentially the same as that described above but its left end, as seen in FIG. 12, is pivoted to the side of carriage 17 in a manner which restrains movement of the plate essentially to its own plane.

A work contact wheel 416 is attached to the right end of plate 25, to ride on the surface of the pipe adjacent the weld line. It is located opposite and quite close to the tip 161 of the welding head. Gas nozzle 152, as described above, is close by. The spacing of both the tip 161 and nozzle 152 is thus controlled by the feeler or contactor wheel 416 as it rides on the work surface 11 and follows its abnormal surface elements. The broad base pivot at the left plus a component of force imparted by a tension spring at the right insure that the frame 25 will move only in its plane, parallel to the side of the carriage on which it is mounted.

At the left or pivot end a strong compression spring 409 on a bolt 410, threaded into plate 25, is compressed by nut 411. Its load is transmitted through a spacer 404, FIG. 14, to a sealed ball bearing 405 and against a rear pivot support block 407. The latter is fastened securely to the side of carriage 17 by bolt 406. Bolt 406 also passes through a spacer block 408. A supplemental bolt or pin 412 prevents rotational movement of blocks 407 and 408 about bolt 406. A wide based thrust bearing, e.g., a needle bearing, is mounted in the rear face of block 407 and is held firmly by the thrust of spring 409 against a spacer plate 401 which bears against the front face of plate 25. An O-ring or equivalent seal 402 keeps dust out of the assembly so that the plate 25 is free to move pivotally in its own plane with respect to carriage 17. Block 408 spaces the plate 25 slightly away from the face of the carriage. In order to make this pivot adjustable, so as to adjust the angle of the welding head with respect to the radius or perpendicular of the work, several holes 400 from bolt 406 are drilled in plate 408, this angle A which preferably leads the work, is preferably between about 15 and 25 degrees. This leading angle A helps the arc to repress the molten metal pool behind it (to the right, FIG. 12) and thus avoid premature burn-off of the wire W.

The front end assembly with its contractor comprises contact wheel 416 which is attached to a rigid front plate 419. The latter is secured by screws 434 to an adjustable base element 436. This base is essentially similar to T-member 42 described above. A channel shaped cover member 420 is secured to member 436. The precision adjusting screw 35, described above, in this case, passes through the upper flange of the cover member 420 and through block 421 which is attached to or integral with plate 25 and analogous to member 33 described above. The lower end of the screw 35 engages element 436 and is adapted to raise or lower this element through channel or cover member 420 when the screw is adjusted.

The wheel 416 which rides around the pipe surface is mounted in a recess 437 in a housing 415. It is mounted therein on an axle 418 and spaced from the sides of the recess by spacers 417. A nylon or equivalent anti-friction spacer or stand-off button 435 is set in the front face of the carriage and the plate 25 rides against this as it moves up and down about pivot 410.

A quick release over-center spring assembly including tension spring 424 normally holds the wheel 416 against work surface 11. It also has a component of force which holds the plate 25 against button 435. Spring arm 428 is attached to a block 431 on a rigid handle 432, shown fragmentarily in FIG. 13, which is attached to or forms part of the carriage 17. A shoulder bolt 429 passes through arm 428 into block 431, permitting free pivotal movement of the washers 430 which space the arm from block 431. A release handle 425 at the other end of arm 428 is mounted on the arm by shoulder bolt 426 for free turning, the handle being spaced from arm 428 by bushings 427 to permit attachment of one end of a tension spring 424, as shown in FIG. 12. The other end of spring 424 is mounted on the vertical adjustment block 421 by a bolt 423, being spaced from this block by a locking spacer 422 threaded on bolt 423. Normally, spring 424 holds the lower or free end of arm 428 against a stop 433 secured to carriage 17. It also holds plate 25 against the button 435 and close to the side of the carriage. When handle 425 is moved counterclockwise past the center position, as shown in the arcuate dotted line, FIG. 13, tension spring 424 contracts and lifts the plate 25 and associated welding mechanism clear of the pipe. This permits inspection, cleaning and replacement of the welding torch tip 161, gas nozzle 152 and associated parts. In the normal full-line position, spring 424 holds the nozzle down and follower 416 rides on the surface of the work.

FIGS. 15 and 16 illustrate diagrammatically a feature of the invention which permits precise and variable control of the arc. This is valuable especially where the head is to be oscillated to fill a gap, or for a capping pass, or where it is desirable or necessary to feed wire electrode into a gap at a considerable angle to the plane of the joint.

The apparatus of FIG. 11 is suitable for providing the movable pivot point in space which characterizes FIGS. 15 and 16. In FIG. 15 a welding head 501 is shown tilted to the left in full lines and to the right in dotted lines. It can be rocked about on imaginary pivot axis 500, located within the body of the head a short distance above the arc. The arc is shown in a wide gap 503 in work pieces 505 and 507. By oscillating the head about axis 500, the gap may be filled very full in the corners. The upper part of head 501 may be moved or oscillated over an amplitude indicated by arrow 509.

In FIG. 16 the pivot axis 500 is shown moved down to or very near the arc. With this arrangement the direction of the arc and of introducing the electrode material into the gap 510 may be varied through a wide angle, even though the gap is very narrow. The axis of shaft 316, FIG. 11, can be shifted, as explained above in connection with that figure, and the axis of rocker shaft 101 of FIGS. 1 and 3 can be made adjustable for the same purpose if desired. This may involve making bracket 110 of FIG. 3 adjustable with respect to the supporting frame. However, other means of adjustment may be used, as will readily be understood by those skilled in the art.

In all forms of the invention, and in their obvious variants, as will be understood by those skilled in the art, the welding machine is carried with precision along its orbital path by a self-propelled carriage. This carriage is indicated generally at 350 in FIG. 11, which also shows a control box 360 mounted on the carriage. In FIG. 1 a control box would be used but it is not shown. It houses electronic speed and sequence control mechanism for regulating wire feed speed, carriage travel speed, time of initiation of the wire feed with respect to time of initiation of travel, etc., as is required for precision welding. The particular controls housed in box 360 are known, at least, in principle, having been used in other welding machinery. They form per se no part of the present invention.

In its broadest aspects, the present invention comprises welding apparatus adapted to be carried along the weld plane. In this case of pipelines it is carried in an orbital path about the work. This apparatus includes a main adjustable side frame member or plate which can be secured firmly to a precision orbiting carriage. This plate preferably is pivotally mounted on the carriage for movement about its pivot in a plane which is approximately parallel with the general plane of the weld to be made. The plate is mounted for angular adjustment in its own plane, to raise the welder head away from the work for inspection and repair as well as to adjust the spacing of the nozzle or head and associated parts from the work. A sub-frame or secondary frame member is attached to the side plate by a pivot means, having an axis which is approximately perpendicular to the axis of the first pivot and may be arranged radially to a pipeline. At least it generally lies in or parallel to the weld plane. It is therefore referred to above as a "vertical" or "radial" axis, although technically it may be neither in a precise sense. The welding head, in turn, preferably is supported on a tertiary member, pivoted to the secondary frame along a diffent or secondary axis, generally perpendicular to the axis just mentioned. Precision means are provided, such as screw 88, FIGS. 1 and 5, or screw 234, FIG. 11, for shifting the sub-frame about the primary or so-called "vertical" axis. Precision means are provided also for shifting this subframe about the secondary axis. Of course, these two axes may not and usually need not actually intersect; i.e., they may not be in the same plane. They are arranged, however, so as to provide for precision adjustment of the welding head in the plane of the weld and also to provide precision lateral adjustment of the welding head; i.e., with respect to the weld plane. While the head may be oscillated; i.e., rocked with respect to the plane, it can be adjusted into or out of that plane without any tilting movement. Preferably, means are also incorporated for rocking or reciprocating the head in sinusoidal fashion in various amplitudes of movement, as the welder travels around the joint in its orbital movement. The latter feature may be used particularly when a deposit of metal is to be made wider than the normal weld deposit. Other features of the invention will be self-evident from the detailed description given above.

While the detailed description above applies primarily to apparatus for welding girth joints in pipelines, it will be obvious that, with minor modifications self-evident to those skilled in the art, the invention can be applied to welding of plates in edge to edge relationship and to many other welding jobs where travel along a guideline and filling a gap with deposited metal is required.

In usual practice, welding of girth joints in a pipeline is practiced by driving one welding device from a starting position at the top of the pipe around one side to the bottom, the gas flow being directed and of appropriate velocity to resist flow of molten metal ahead of the arc, as explained above. Then the other side is welded in a similar manner, from top to bottom, usually employing a second welding device which is reverse handed with respect to the first. However, under favorable conditions, a single welder may go all the way around, in which case gas flow will be reduced on the ascent.

Still other modifications and variations will suggest themselves to those skilled in the art. It is intended by the claims which follow to cover the invention described as broadly and adequately as the prior art properly permits.

What is claimed is:

1. In an electric arc welding apparatus for forming a joint in a weld plane between two adjacent work pieces such as lengths of pipe to be secured together in a girth joint lying substantially in said weld plane, the combination which comprises a self-propelled carriage, having a plane side surface element substantially parallel to said weld plane, a side frame member having a plane surface adapted to fit against said plane side surface element of the carriage, frictional pivot means for securing the side frame member with its plane surface firmly against the carriage plane side surface to permit forced pivotal movement, supplemental locking means for securing the side plate to the carriage against said forced pivotal movement, a subframe pivotally secured to the side plate on a pivot axis which is substantially parallel to the weld plane, said axis intersecting the work surface adjacent the weld plane, a welding head mounted on said subframe for movement substantially in the weld plane and along the weld joint as the carriage travels, and precision welder positioning means acting between the side plate and the subframe for specifically controlling the position of the welding head in a direction transverse to the welding plane.

2. Apparatus according to claim 1 which includes a precision stop positioning element adapted to reestablish precision setting of the side frame when it is moved out of and returned to a working position.

3. Apparatus according to claim 2 in which the side frame is pivotally attached at one end to the carriage and including a releasable locking means to secure the opposite end of said side frame to said carriage.

4. Apparatus according to claim 1 which includes means on the side frame for mounting a supply of consumable wire electrode, and precision means for feeding said wire to the welding head at a controlled rate.

5. Apparatus according to claim 1 which includes an adjusting means including a micrometer adjustment device, a limit stop engageable by said device, and releasable lock means for selectively securing said adjustment device to said stop in a precisely adjusted position or releasing it freely from said position.

6. Apparatus according to claim 1 in which one end of said side frame is free floating and bears a contactor adapted to ride on a work surface adjacent the weld for forcibly controlling the welding head with respect to distance from said weld.

7. Apparatus according to claim 1 wherein the pivot axis supporting the subframe is generally parallel to the axis of the welding head and the welding head is pivoted to the sub-frame on a secondary axis which substantially intersects said head, and means for moving the welding head about the secondary axis to shift it laterally or axially of the work with respect to the weld plane.

8. Apparatus according to claim 7 in which the secondary axis is adjustable to intersect the head at selectively variable distances from the arc.

9. Apparatus according to claim 8 which includes means for reciprocating the welding head about the secondary axis to produce a sinusoidal weld pattern and deposit weld metal over a widened path as the welding head travels along the joint.

10. Apparatus according to claim 8 in which a motor driven oscillating mechanism is mounted adjacent to said secondary axis, for periodically oscillating the welding head about the secondary axis.

11. Apparatus according to claim 8 in which the oscillating mechanism comprises a variable throw crank member rotatable about an axis parallel to the secondary axis.

12. Apparatus according to claim 1 which includes a first adjusting micrometer means operable between the side frame and the sub-frame for adjusting the operating position of the welding head transversely with respect to the plane of the joint.

13. Apparatus according to claim 12 which includes cyclical reciprocating operating means independent of the micrometer means for periodically shifting the head support laterally as the head travels.

14. Apparatus according to claim 1 which includes means for mounting a supply of consumable electrode wire on the side frame member, feeding means for said electrode wire mounted on the sub-frame member, and stiffly flexible wire guide means extending from the feeding means to the welding head adapted to apply a restoring force to the head when the head is displaced from a normal working position and adapted further to direct the wire into the head without imparting a cast thereto.

15. Apparatus according to claim 1 which includes a nozzle for directing an inert shielding gas tangentially over the metal around the welding arc with direction and velocity such as to cool and stabilize the metal pool around said arc.

16. Apparatus according to claim 15 in which the nozzle is arranged to direct gas across the pool in a direction and with velocity to offset the effect of gravity on said pool.

17. Apparatus according to claim 1 which includes a hub for mounting a spool or reel of electrode wire on the frame, means for holding an element of said hub against rotation as the wire is unrolled, and means for applying a frictional force between the spool or reel and said element, thereby to resist rotation of the spool or reel and maintain tension on the wire.

18. Apparatus according to claim 17 in which the friction means includes a brake element and variable means for applying pressure on said brake element.

19. Apparatus according to claim 19 which includes a lever operated cam for locking the spool or reel to the hub.

20. Apparatus according to claim 1 especially adapted for welding pipelines and the like, which includes a band encircling the pipeline and forming a guide track for the carriage, means for feeding a stream of gas across the weld metal pool at the arc to cool said arc and resist flow of said metal by gravity and means for setting the welding head at a leading angle between 15 and 25 degrees of arc to assist in controlling said metal pool.

21. Apparatus for forming a welded girth joint in a pipeline and in a plane substantially perpendicular to the axis of said pipeline which comprises, in combination, a traveling carriage, means for guiding said carriage with precision around said pipeline and parallel to said joint, a side frame for carrying a welding instrument around said joint, said frame being pivotally secured to the carriage at one end, a set of separable precision stop and positioning elements secured respectively to the other end of the frame and to a guide unit, means for adjusting one of said stop elements to establish a working position for the welding instrument in respect to its spacing from the work being welded, and releasable means for securing the stop elements together to control said working position during a welding operation.

22. Apparatus according to claim 21 which includes further means for adjusting laterally the alignment of a welding instrument carried by the frame with respect to the plane of the weld joint.

23. Apparatus according to claim 21 in which an adjustable stop means on the frame is carried by a micrometer adjusting screw and the cooperating stop means on the carriage is bolted to said carriage.

24. Apparatus according to claim 21 in which the head is movably mounted on the frame for pivotal movement about a secondary axis and wherein the alignment of said secondary axis is adjustable to vary the alignment of said secondary axis with respect to the welding head.

25. Apparatus according to claim 21 in which the frame at its non-pivoted end rides on a floating guide unit which contacts a circumferential surface of the pipeline adjacent the joint being welded, and resilient means for holding said guide unit against the work.

26. Apparatus for forming a welded girth joint in a plane between adjacent ends of annular work members such as lengths of pipe and the like, which comprises in combination a traveling carriage, a precision guide track means adapted to be secured to one of said work members parallel to the end to be joined for guiding said carriage in a path parallel to the weld plane, a side frame attached to a plane side element of the carriage which side element is substantially parallel to the weld plane, a subframe pivotally mounted to the side frame on a pivot axis which is substantially parallel to the weld plane and which intersects the surface of the work member to which the guide track is secured, and a welding head having an axis more or less perpendicular to the work surface, said head being pivotally mounted to the subframe on a pivot axis which substantially intersects the weld head axis.

27. Apparatus according to claim 26 which includes precision stop means secured to said carriage, precision stop means secured to said frame, means for securing said stop means together for locking the frame in a desired position with respect to said carriage, and means for adjusting one of said stop means to vary said desired position.

28. Apparatus according to claim 26 in which the frame is attached to the carriage at one end for free pivotal movement and in which the other end of the frame is adapted to float on a contact mechanism adapted to follow the contour of the work body adjacent the joint being welded.

29. Apparatus according to claim 1 in which the head is mounted to be presented at an angle of between 15 and 25 degrees of arc with respect to a perpendicular to the work.

* * * * *